March 12, 1957 R. H. LISKA 2,784,612
MECHANISM FOR IMPARTING ROTARY MOTION
TO INDEX TABLES AND THE LIKE
Filed March 8, 1955 6 Sheets-Sheet 6
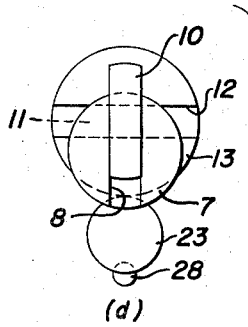
(d)
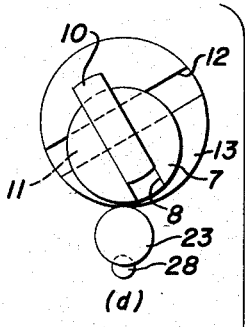
(d)
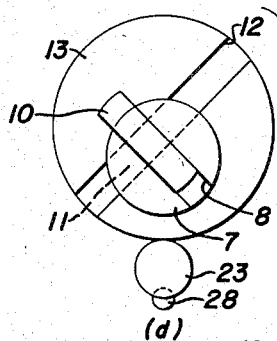
(d)
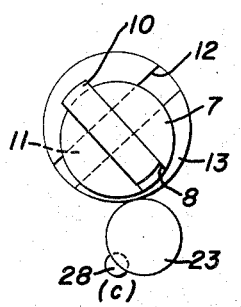
(c)
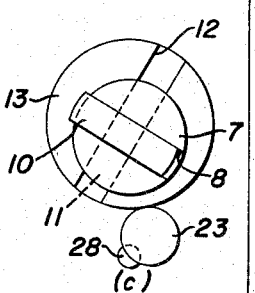
(c)
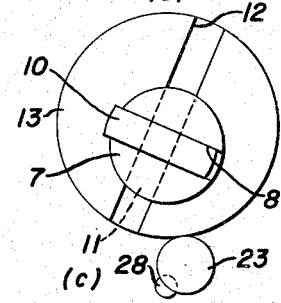
(c)
FIG. 7  FIG. 8  FIG. 9
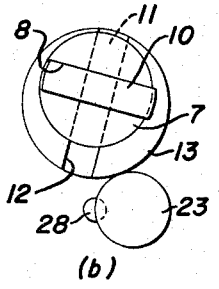
(b)
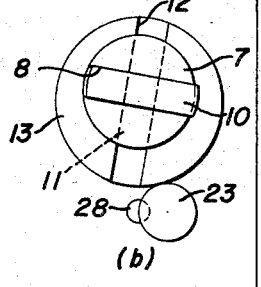
(b)
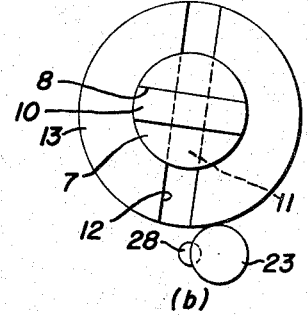
(b)
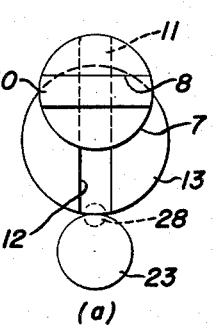
(a)
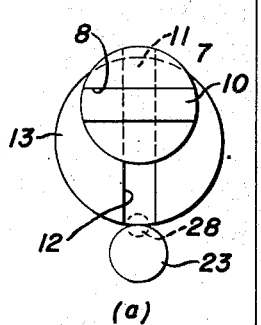
(a)
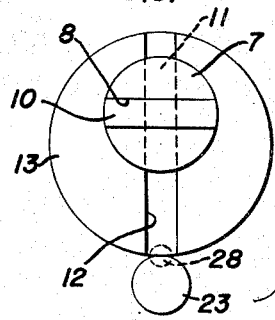
(a)
INVENTOR.
RAYMOND H. LISKA
BY
ATTORNEY

United States Patent Office 2,784,612
Patented Mar. 12, 1957

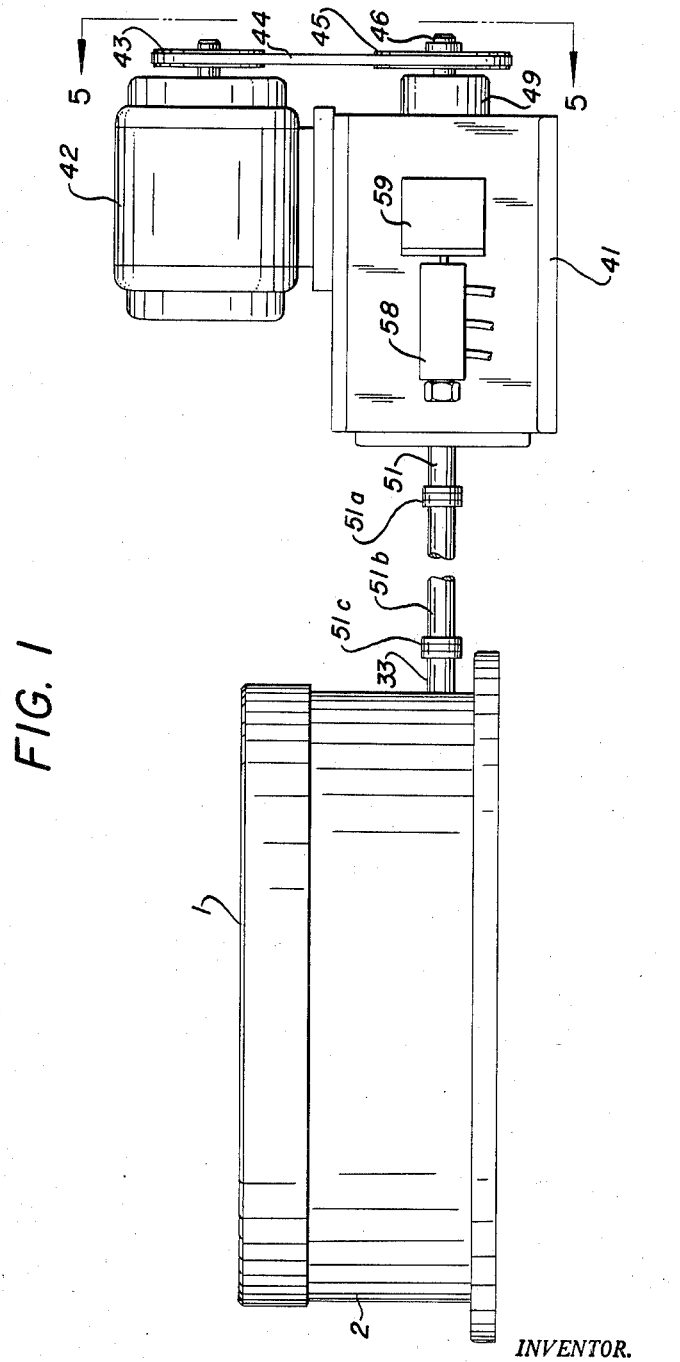

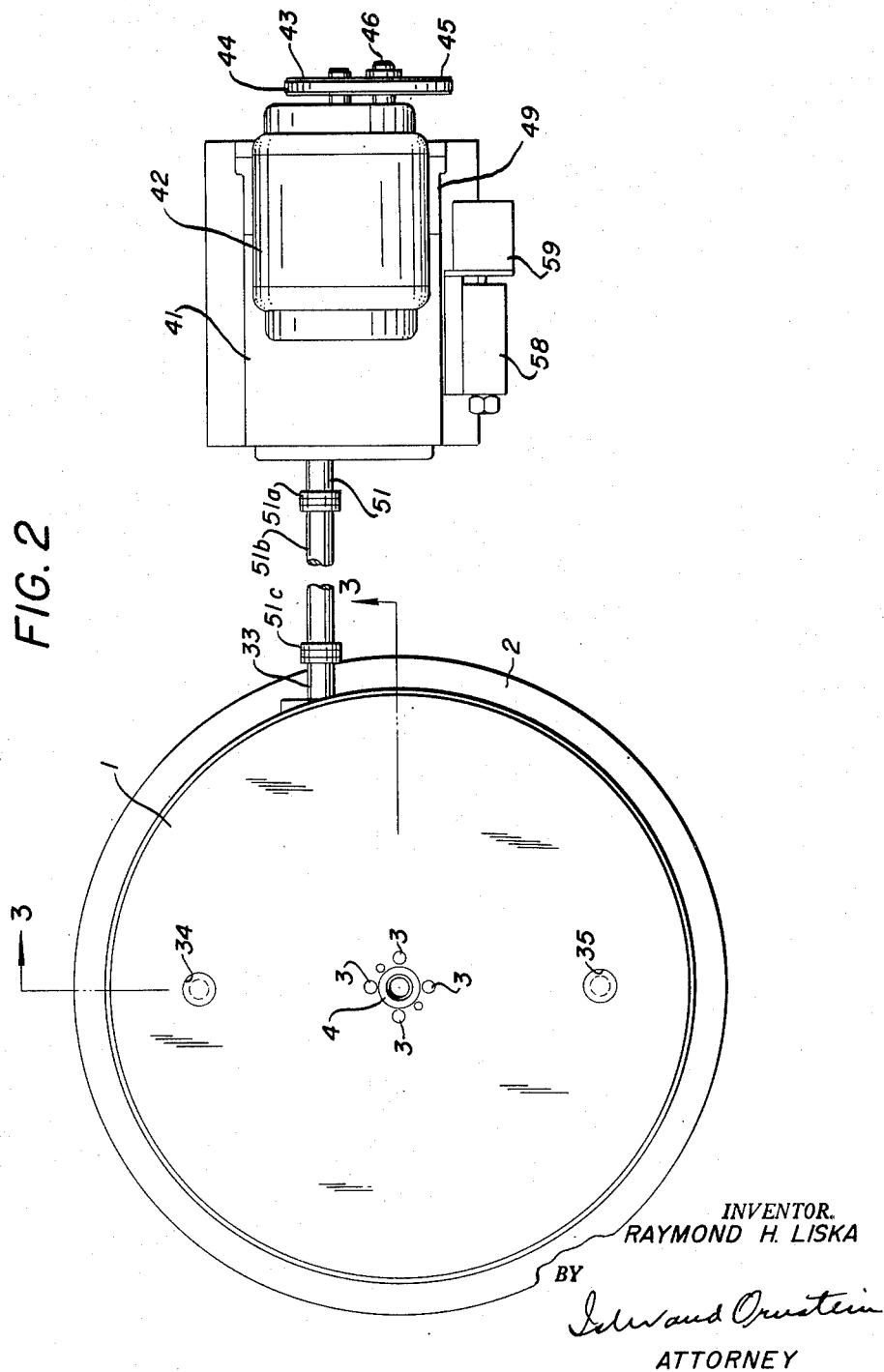

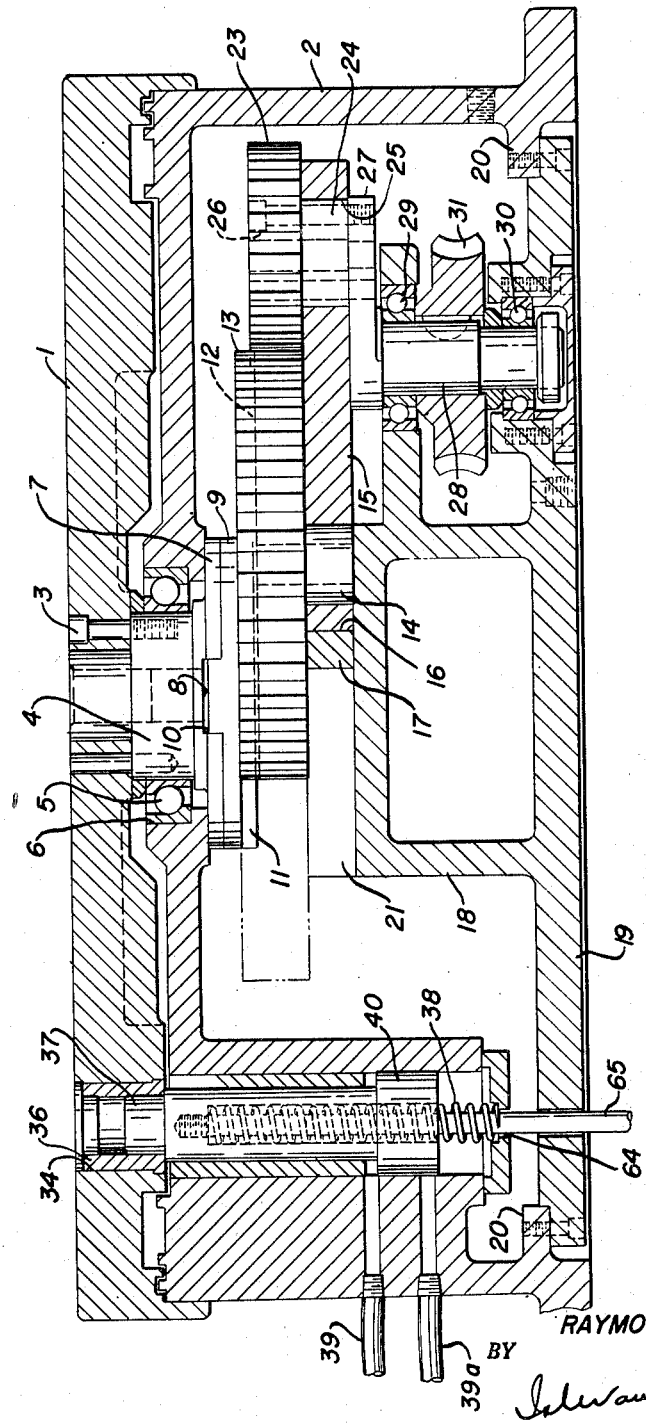

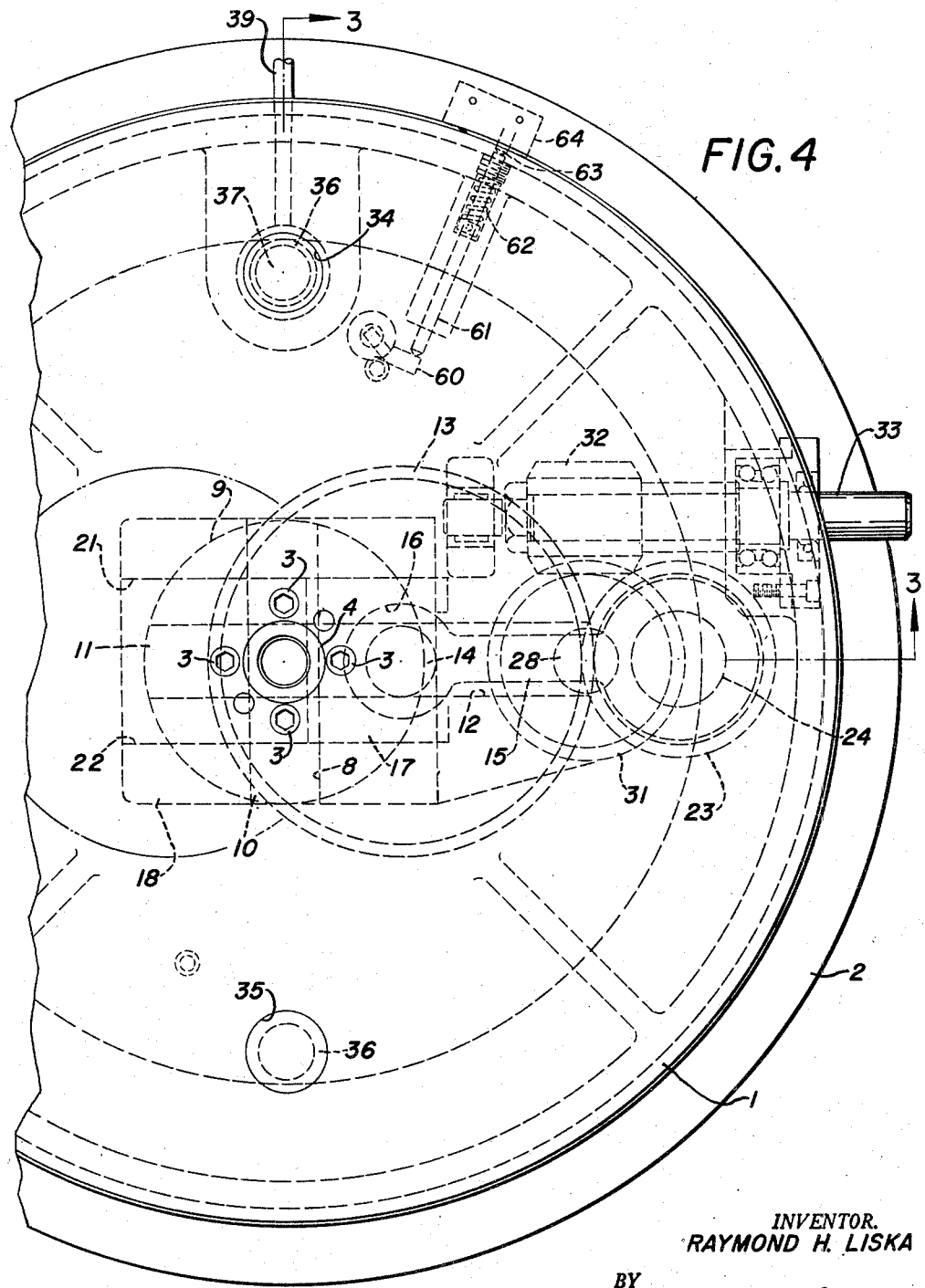

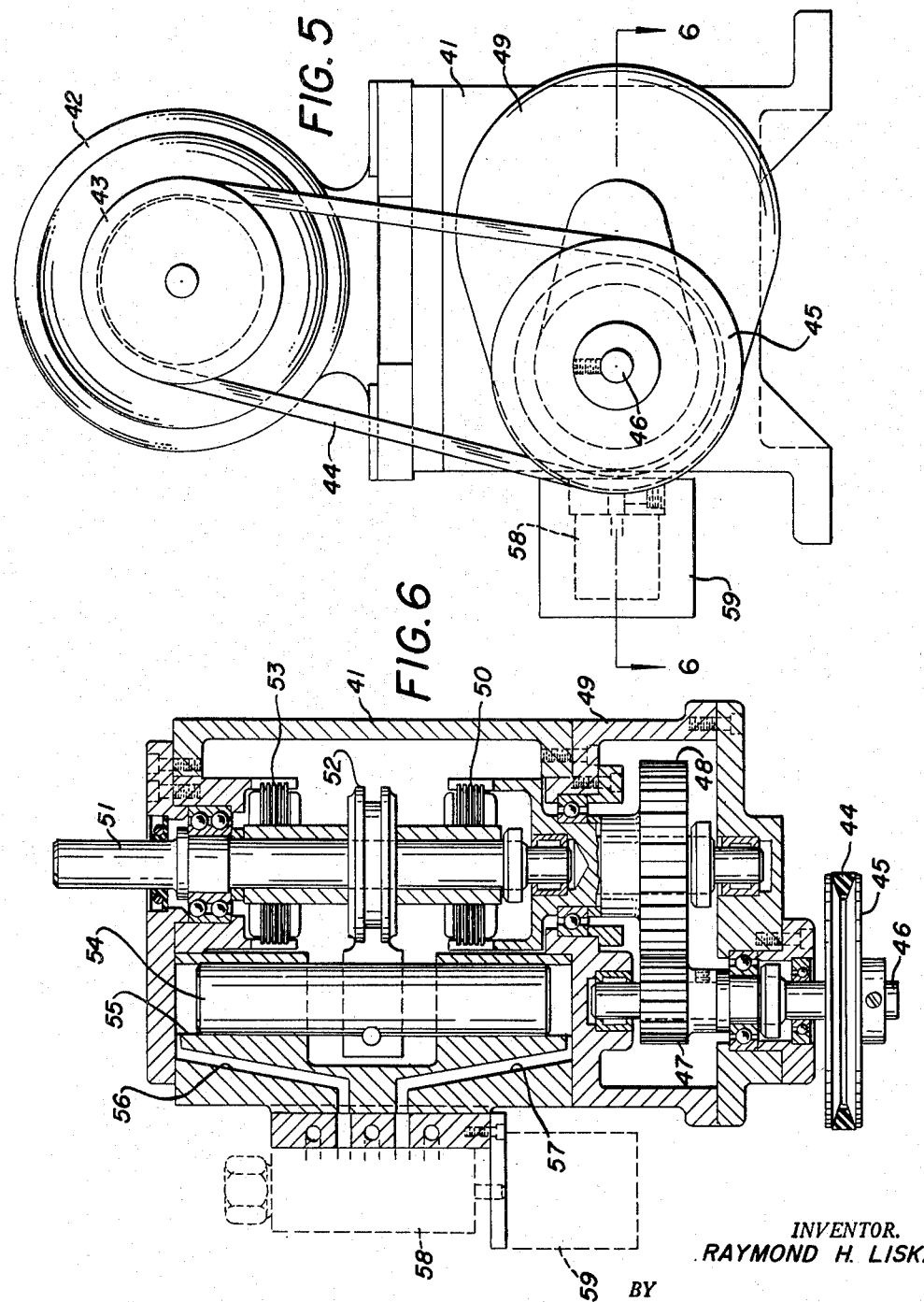

2,784,612

MECHANISM FOR IMPARTING ROTARY MOTION TO INDEX TABLES AND THE LIKE

Raymond H. Liska, Cleveland, Ohio, assignor to The Cleveland Universal Jig Company, Cleveland, Ohio, a corporation of Ohio Application March 8, 1955, Serial No. 493,007

6 Claims. (Cl. 74—393)

This invention relates generally to mechanism or means for imparting rotary movement to index tables and the like, but has reference more particularly to a mechanism which will impart a movement which is not uniform or constant throughout the cycle of rotation.

In my copending applications, Serial Nos. 396,942, 402,743 and 409,732, I have disclosed mechanisms which impart an intermittent rotary motion to an index table or the like, without shock, and while keeping the table under positive control throughout the cycle. Such mechanisms impart to the index table a rotary motion or movement which progressively increases in velocity or speed at one station to a maximum speed or velocity at a point midway between said station and the next station, and back to zero speed or velocity at the next station.

The present application is directed to improvements which permit the mechanism which accomplishes the aforesaid variable motion to be incorporated or installed in the base of the index table, thereby utilizing space which is often wasted, and providing a compact single unit instead of separate units which characterize the devices of the aforesaid copending applications.

The improvements further contemplate the use of a modified Oldham's coupling in the mechanism, which permits the aforesaid compact arrangement.

Other objects and advantages of my invention will be apparent during the course of the following description.

In the accompanying drawings forming a part of this specification and in which like numerals are employed to designate like parts throughout the same, Fig. 1 is a side elevational view of apparatus embodying the invention;

Fig. 2 is a top plan view of the apparatus of Fig. 1;

Fig. 3 is a cross-sectional view, taken on the line 3—3 of Fig. 2;

Fig. 4 is a fragmentary top plan view of the index table;

Fig. 5 is an end elevational view of a combined clutch and brake unit for driving the index table;

Fig. 6 is a cross-sectional view, taken on the line 6—6 of Fig. 5;

Fig. 7 is a view showing diagrammatically the movement of various parts of the mechanism during half of the indexing cycle;

Fig. 8 is a view similar to Fig. 7, but showing a variation in the size of certain parts of a 3-station indexing table, and Fig. 9 is a view similar to Fig. 7, but showing a still further variation in the size of certain parts for a 4-station index table.

Referring more particularly to Figs. 1 to 7 inclusive of the drawings, the index table will be seen to comprise a table 1 mounted for rotation on a base 2. The table has secured to the central portion thereof, as by means of bolts 3', a hub 4 which is rotatable in a ball-bearing 5, which is mounted in a recess 6 in the central portion of the base 2.

The hub 4 is provided with an enlarged flange 7, having a groove 8 extending diametrically across the lower face of the flange.

Disposed immediately below the flange 7 is an intermediate disc 9, provided on its upper face with a tongue 10 extending diametrically thereacross, which tongue extends into the groove 8 and is slidable therein. The disc 9 is provided on its lower face with a tongue 11 extending diametrically thereacross, but at right angle to the tongue 10. The tongue 11 extends into a groove 12 which extends diametrically across the upper face of a large gear 13 disposed immediately below the intermediate disc 9.

The flange 7, disc 9 and gear 13 constitute elements of what is, in effect, an Oldham's coupling, used for transmitting rotation at a uniform rate of the gear 13 to the table 1, the axes of the gear and the table being parallel with each other, but slightly out of line (see vol. II, page 230 of Machinery's Encyclopedia, 1917, and vol. II, page 1560, of Knight's American Mechanical Dictionary, 1876).

The gear 13 is provided with a stub shaft 14 which is mounted for rotation in one end of a link or arm 15 which is disposed below the gear 13. This end of the link 15 is swivelled in an opening 16 in a block 17, which is guided for reciprocal movement in an upstanding member 18 of a base plate 19, which is secured to a flange 20 of the base 2. The block 17 is guided in its reciprocal movement by guideway surfaces 21 and 22 of the member 18.

Mounted on the other end of the link 15 is a gear 23 which is in driving engagement with the gear 13. The gear 23 is provided with a stub shaft 24 which is mounted for rotation in an opening 25 in the link. The gear 23 is rigidly secured, as by means of bolts 26, to one end of a crank arm 27 which extends laterally from the upper end of a crankshaft 28. The crankshaft 28 is journalled for rotation in bearings 29 and 30 which are mounted respectively in the member 18 and base plate 19.

The axis of the shaft 28 intersects the pitch circle of the gear 23 and this relationship remains constant throughout the operation of the device, which will be presently described.

The crankshaft 28 has keyed thereto a worm wheel 31, which is driven by a worm 32, which is mounted on a drive shaft 33, one end of which extends through the base 2, as shown in Fig. 4.

The index table 1 is provided at circumferentially-spaced points with recesses 34 and 35, in which are mounted bushings 36, which are adapted to receive the index pin 37 (Fig. 3), for the purpose of locking the table to the base 2. The recesses 34 and 35 define stations of a two-station table, and in this case, are 180 degrees apart. It will be readily understood, however, that the table may be provided with any desired number of such recesses, defining additional stations.

The index pin may be actuated in any desired or conventional manner. In this case, the index pin is automatically moved into locking position by means of a compression coil spring 38, and is retracted by means of compressed air which enters the base 2 through a conduit 39, to exert pressure on the piston-like head 40 of the index pin. A second conduit 39a is provided which also admits air into the cylinder in which the head 40 moves.

The mechanism for driving the shaft 33 is shown in Figs. 1, 2, 5 and 6, and comprises a clutch and brake housing or unit 41, on which is mounted an electric motor 42. The motor 42, through the intermediary of a pulley 43, endless belt 44, and pulley 45, drives a shaft 46 and gears 47 and 48, these gears being disposed within a gear box 49 which is secured to one end of the housing 41.

The gear 48 drives a clutch 50 which may be energized to drive a shaft 51, by movement of a colar 52 into engagement with this clutch, or the shaft may be stopped by movement of this collar into engagement with a brake 53. The shaft 51 drives the intermediary of a universal coupling 51a, a connector shaft 51b, and a universal coupling 51c. This combined clutch and brake unit is standard equipment, known as a Twin Drive Clutch (Model MTU and MTS clutches). The collar 52 may be moved in either direction along the shaft 51 by means of a piston 54 which is mounted for reciprocal movement in a cylinder 55 in the housing 41.

The piston is moved in a downward direction, as viewed in Fig. 6, by air pressure delivered through a passageway 56, and may be moved in the opposite direction by means of air pressure delivered through a passageway 57. The passage of air through the passageways 56 and 57 is controlled by an air valve 58, which may be a C. B. Hunt air valve, movement of which is controlled by a solenoid 59. The details of this valve need not be described, since it, also, is standard equipment.

The driving mechanism which has been described is designed to rotate the index table between stations, but in view of the large mass which is to be thus moved, it is desirable to impart to the table a rotary motion which gradually varies from a zero velocity or speed at one station to a maximum speed or velocity at a point midway between that station and the next station, and back to zero speed or velocity at the next station. It is desirable, in other words, to produce an intermittent rotary motion which will start and stop the index table without shock and yet keep the table under positive control throughout the cycle.

Such a motion has been obtained by means of the various drive mechanisms shown and described in my copending applications, Serial Nos. 396,942, 402,743 and 409,732.

In the present case, the motion is obtained through a modification of the mechanisms described in the aforesaid applications, with the elimination of certain parts of those mechanisms which is designed to reduce costs to some extent, and utilize a more direct drive of the index table.

The improvements are designed particularly with a view to permitting the mechanism which accomplishes the aforesaid variable motion to be incorporated or installed in the base of the index table, thereby utilizing space which is often wasted, and providing a compact single unit, instead of the separate units which characterize the devices shown in the aforesaid copending applications.

The gear ratios in the present device are such that one complete revolution of the shaft 28 will produce a half revolution of the index table 1, which is equivalent to rotation of the table between its two stations.

The shaft 28 drives the index table through the intermediary of the crank arm 27, gear 23, gear 13, disc 9, flange 7 and hub 4.

Since the gears 23 and 13 correspond to the gears 33 and 35 respectively in copending application, Serial No. 402,743, the movement will be somewhat similar to that described in said application, but translating movement of the table is avoided by using the link 15 which has a combined oscillatory and reciprocatory movement, similar to that of the arm 16 in copending application, Serial No. 396,942. Moreover, the drive of the table is not effected directly by the gear 13, as in Serial Nos. 402,743 and 409,732, but through the intermediary of the modified Oldham's coupling, which has been described.

This combination of elements of the driving mechanism produces the desired variable speed of the index table, while, at the same time, permitting the mechanism to be installed in the base of the index table, thereby providing a compact single unit.

The movement of the gear 13, during a single cycle of rotation of the shaft 28 can be best understood by reference to diagrams in Figs. 6, 7, 8 and 9 of copending application, Serial No. 396,942, and the description thereof.

Fig. 7 of the present drawings shows the relative position of the shaft 28, gear 23, gear 13, flange 7, and tongue 10 at various points during one half revolution of the shaft 28 in a counterclockwise direction, as viewed in this figure. Fig. 7(a) corresponds to the position of the parts as shown in Figs. 3 and 4, and the progressive movement from 7(a) to 7(d) causes the table to rotate from a zero velocity (Fig. 7(a)) to a maximum velocity (Fig. 7(d)), through a process of uniform acceleration. The progressive movement from 7(d) back to 7(a) is one of uniform deceleration to a zero velocity.

In Figs. 2, 3 and 4, means are shown, somewhat diagrammatically, for automatically retracting the index pin 37 at the beginning of the cycle of rotation of the shaft 28 and for automatically returning the index pin to locking position at the conclusion of this cycle. Such means comprises a cam bar 60 mounted on the underside of the table 1, a pin 61, slidably mounted in the table 1, and normally biased to a radially-innermost position by a compression coil spring 62, a pin 63 slidably mounted in the base 2, and a switch 64 mounted on the base 2.

An air vent is shown at 64 and a pull rod at 65. Conduits 39 and 39a are connected to the valve 58, which is normally deenergized, so as to admit compressed air through passageway 57, thereby keeping clutch 50 disengaged and letting air escape through conduit 39 and through valve 58. This permits spring 38 to keep index pin 37 in the locking position shown.

In order to start an indexing cycle, an electric manually operated push button (not shown) will energize the valve 58, thereby reversing the compressed air flow. Air will now flow through conduit 56 into the upper chamber of the index pin cylinder, thereby disengaging the index pin. When the index pin is safely disengaged, the upper surface of the head 40 will uncover the air port to which conduit 39a is attached and carry compressed air through the passageway 56, thereby causing the clutch 50 to become engaged. Since the gear 48 is in constant motion, the index cycle is started and continues until the cam bar 60 cams past pin 61, forcing the pin 61 radially outwardly, moving the pin 63 which, through switch 64, deenergizes the valve 58, reversing the compressed air flow, disengaging the clutch 50, engaging the brake 53, and engaging the index pin. This completes the index cycle, during which the gear 13 will have revolved one revolution, from zero to zero motion.

The aforesaid method of operation provides an interlock which at no time permits simultaneous engagement of the index pin and drive clutch which might cause breakage of parts.

The pull rod 65 is provided for the purpose of manually disengaging the index pin during job set-up or checking.

Fig. 8 is a view similar to Fig. 7, but showing movement of the parts when the index table is a three station table, with the stations spaced circumferentially 120 degrees from each other.

Fig. 9 is a view similar to Fig. 7, but showing movement of the parts when the index table is a four station table, with the stations spaced circumferentially 90 degrees from each other.

In Fig. 8, it will be noted that the gear 23 is smaller than that in Fig. 7, and the gear 13 larger than that in Fig. 7.

In Fig. 9, it will be noted that the gear 23 is of the same size as that in Fig. 8, but that the gear 13 is larger than that in Fig. 8.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In an index table, the combination of a hollow base, a table rotatably supported on said base, a rotary crankshaft mounted in said base, a variable speed power train driven by said crankshaft and reciprocally movable relatively to said table, and means within said base slidably connecting said power train to said table to effect axial rotation thereof.

2. In an indexing mechanism for imparting rotation to an index table, the combination of a rotary shaft, a crank arm on said shaft, a first gear fixedly secured to said crank arm in axially spaced relationship to said shaft, a link having one end thereof pivotally secured to said crank arm coaxially with said first gear, a second gear rotatably secured to the other end of said link in operative engagement with said first gear, means slidably engaging said other end of said link to define a rectilinear path of movement therefor, and an Oldham's coupling connecting said second gear to the index table.

3. In an index table, the combination of a hollow base, a table rotatably supported on said base, a rotary crankshaft mounted in said base, an eccentric gear train driven by said crankshaft, said gear train being reciprocably movable within said base in response to rotation of said crankshaft, means provided on said base for guiding said gear train during reciprocation thereof, and an Oldham's coupling operatively connecting said gear train to said table to effect rotation thereof.

4. In an index table, the combination of a hollow base, a table rotatably supported on said base, a rotary crankshaft mounted in said base, an eccentric gear train driven by said crankshaft, means provided on said base for guiding said gear train during reciprocation thereof, and a slidable coupling maintaining said gear train operatively connected to said table during reciprocation thereof.

5. A combination, as defined in claim 4, wherein said slidable coupling comprises a disk having a first diametrical tongue on one face thereof and a second diametrical tongue on the opposite face thereof, said first tongue being normal to said second tongue, a groove on said table slidably engaging said first tongue, and a groove on said gear train slidably engaging said second tongue.

6. A combination, as defined in claim 4, wherein said eccentric gear train comprises a first gear fixedly secured to said crankshaft in axially spaced relation to the rotary axis thereof, a link having one end thereof pivotally secured to said crankshaft coaxially with said first gear, and a second gear rotatably secured to the other end of said link in operative engagement with said first gear.

References Cited in the file of this patent

UNITED STATES PATENTS

| | | |
|---|---|---|
| 377,133 | Arnold | Jan. 31, 1888 |
| 1,807,889 | Belin | June 2, 1931 |
| 2,150,865 | Shafter | Mar. 14, 1939 |
| 2,395,803 | Bruckner | Mar. 5, 1946 |